May 28, 1968 H. REBER 3,386,060
POWER DISTRIBUTION TRANSFORMER HAVING CONDUCTIVE STRIP WINDING
Filed Jan. 26, 1966 4 Sheets-Sheet 1

INVENTOR
HUBERT REBER
BY
ATTORNEY

INVENTOR
HUBERT REBER

May 28, 1968 H. REBER 3,386,060
POWER DISTRIBUTION TRANSFORMER HAVING CONDUCTIVE STRIP WINDING
Filed Jan. 26, 1966 4 Sheets-Sheet 3
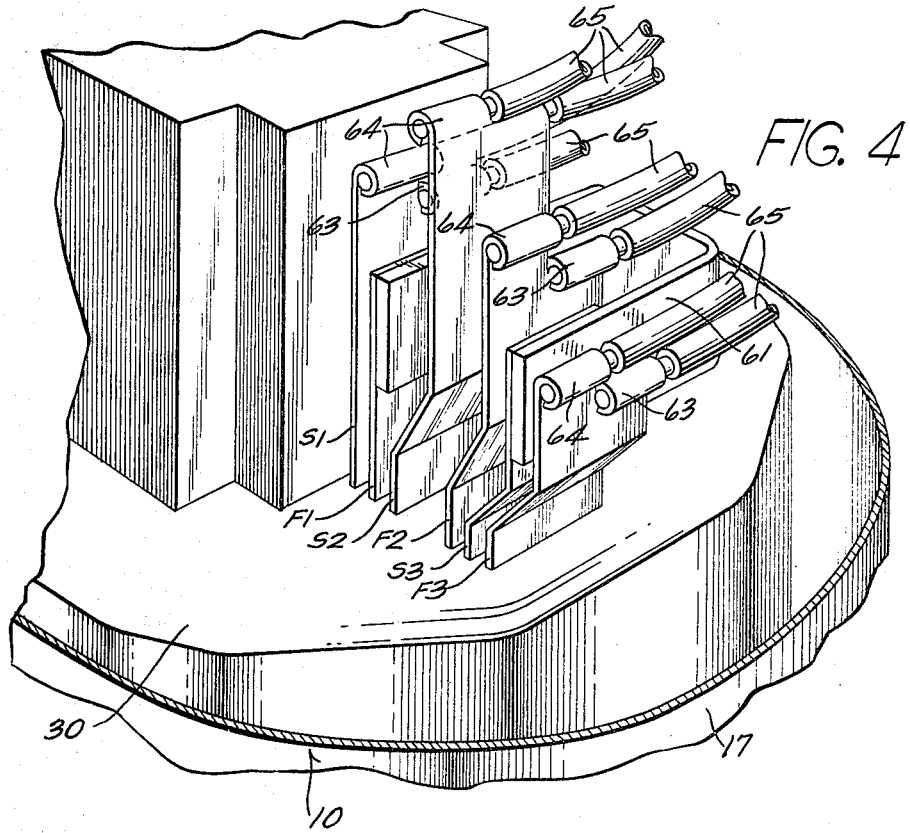
FIG. 4
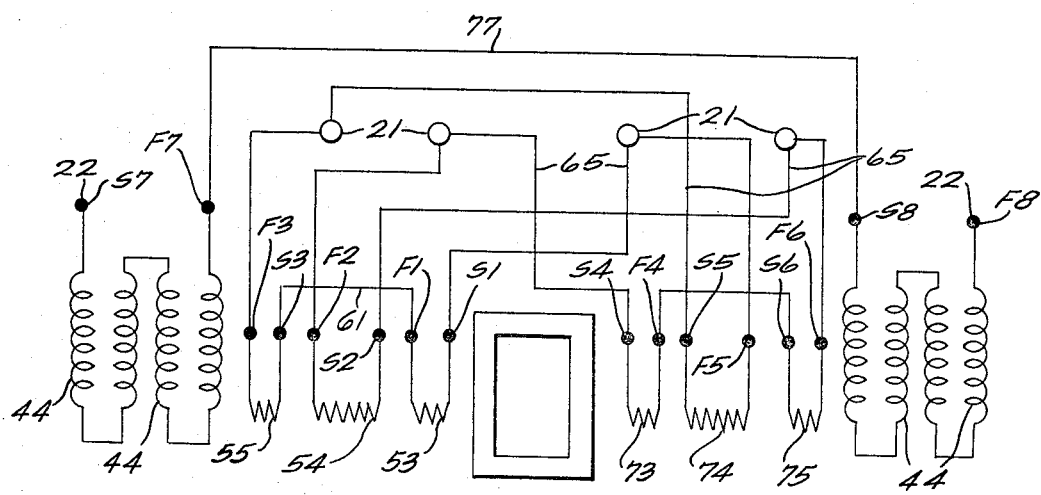
FIG. 6
INVENTOR
HUBERT REBER
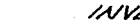
ATTORNEY

United States Patent Office 3,386,060
Patented May 28, 1968

3,386,060
POWER DISTRIBUTION TRANSFORMER HAVING CONDUCTIVE STRIP WINDING
Hubert Reber, Zanesville, Ohio, assignor to McGraw-Edison Company, Milwaukee, Wis., a corporation of Delaware
Filed Jan. 26, 1966, Ser. No. 523,126
5 Claims. (Cl. 336—90)

ABSTRACT OF THE DISCLOSURE

A transformer including a magnetic core and having strip wound coils with secondary leads brought out of the coils adjacent the side of the core directly opposite the window of the core. The secondary leads extend vertically upward from the coils and are of strip material bifurcated at their upper ends with the ends of the furcations bent to form eye terminals.

---

This invention relates to electrical power distribution transformers and in particular to such transformers having windings of conductive strip material.

Known electrical power distribution transformers having conductive strip windings require a larger tank and a greater amount of oil than that required for cooling and insulation purposes because of the non-symmetrical configuration of the core and coil assembly and the differences in shape between the tank and the core and coil assembly. Usually the leads from the conductive strip secondary and the primary leads are disposed on opposite sides of the core and coil assembly, and this arrangement accentuates the dissymmetry and increases the mean length of copper turn and prevents positioning of the blocking means to prevent core movement under short circuit conditions along the sides of the core and coil assembly.

It is an object of the invention to provide an electrical power distribution transformer having a winding of conductive strip material and which is lower in cost and weight and losses than prior art structures. It is a further object of the invention to provide an improved power distribution transformer having a conductive strip winding wherein the core and coil assembly is symmetrical in configuration and conforms closely to the contour of the tank, whereby the tank may be of reduced size and the amount of transformer oil reduced. Another object of the invention is to provide such a transformer having minimum increase in length of copper turn as a result of the build-up caused by the leads to the conductive strip winding.

Figure 2:
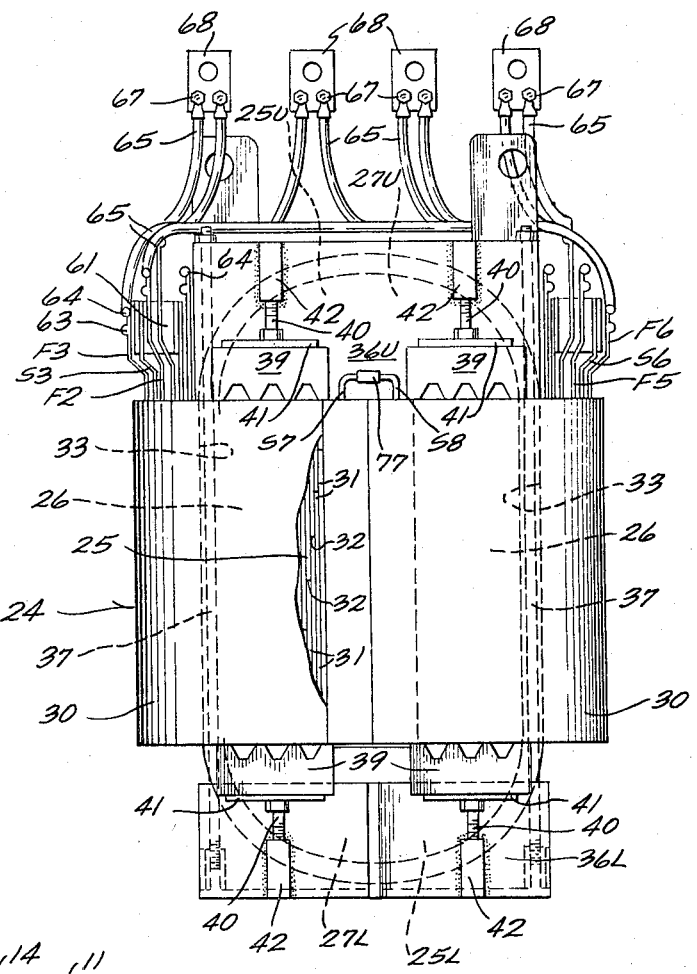
Figure 1:
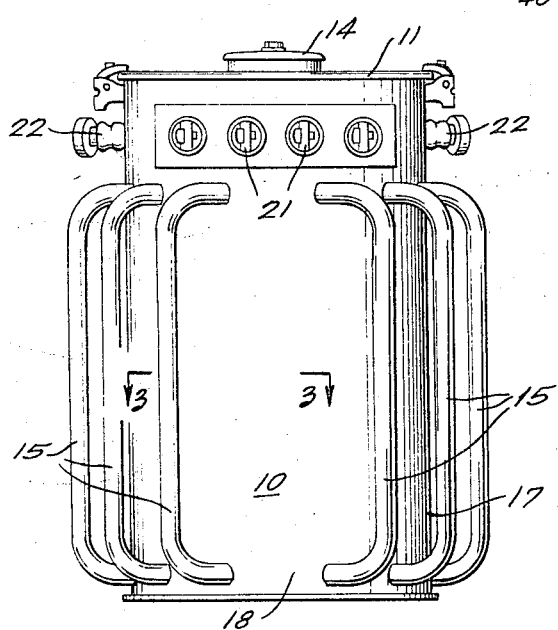
Figure 3:
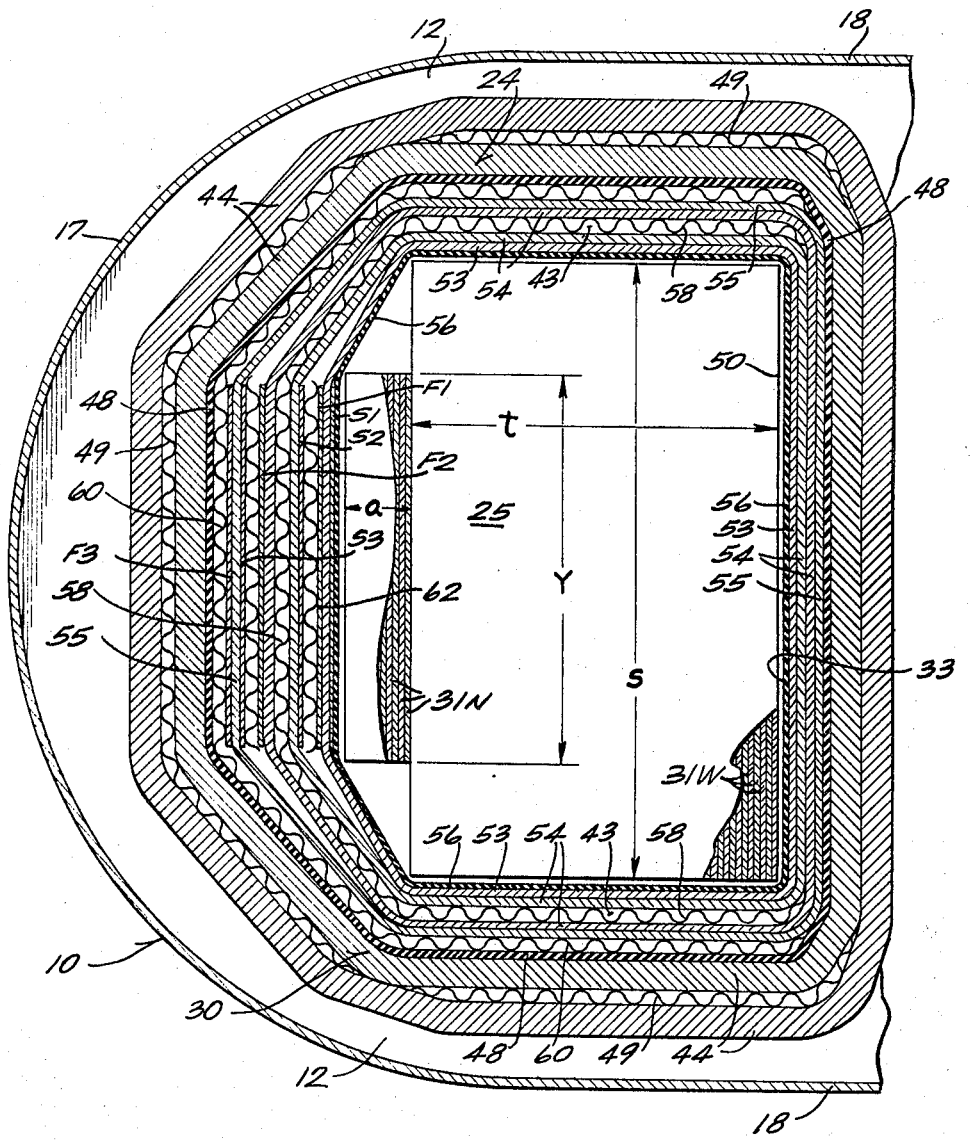
Figure 7:
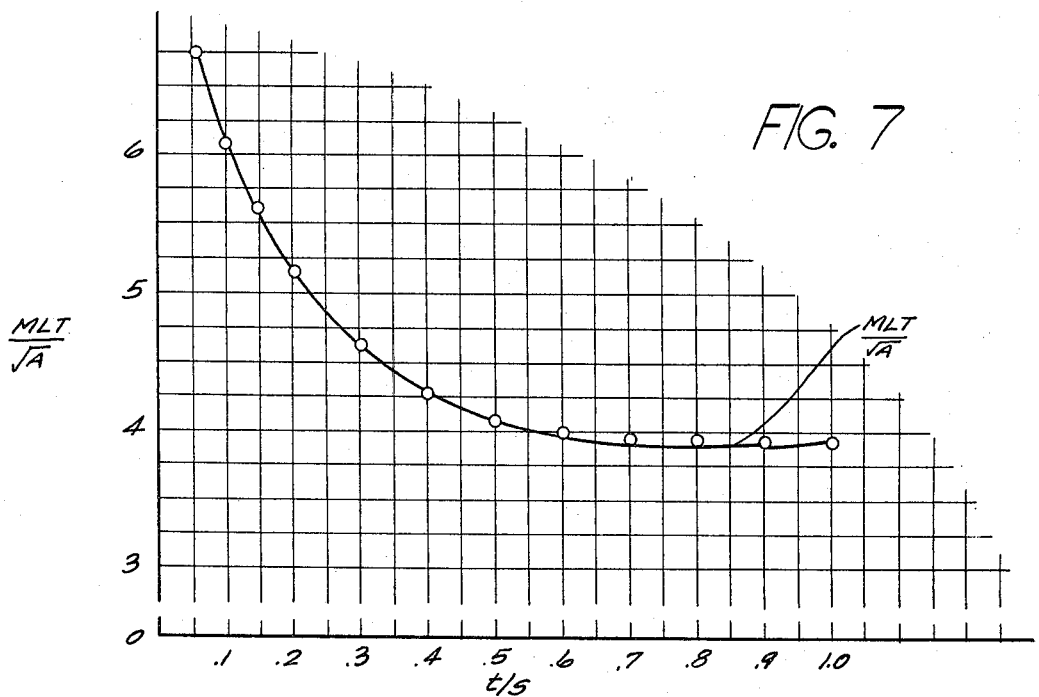
Figure 8:
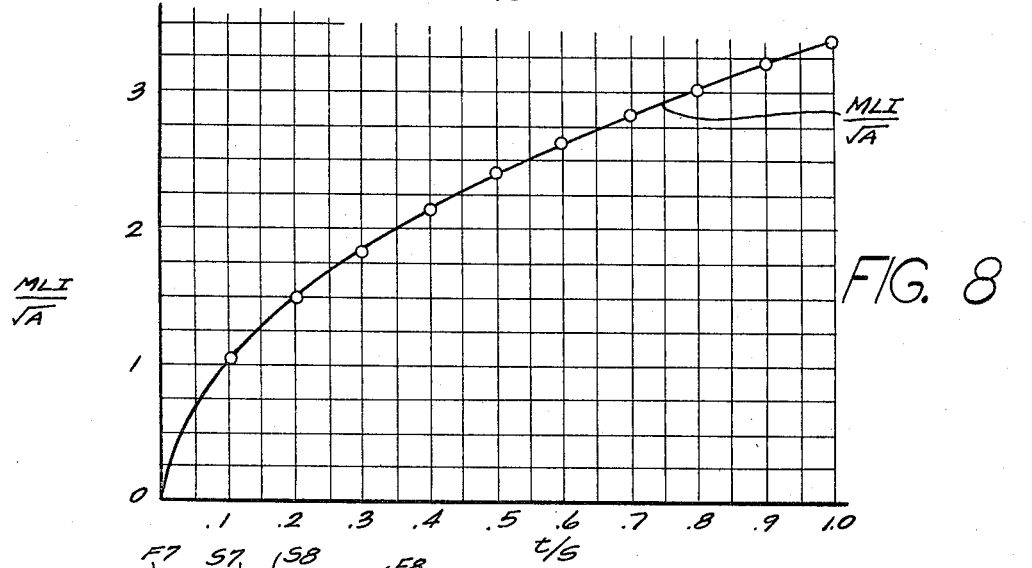
Figure 5:
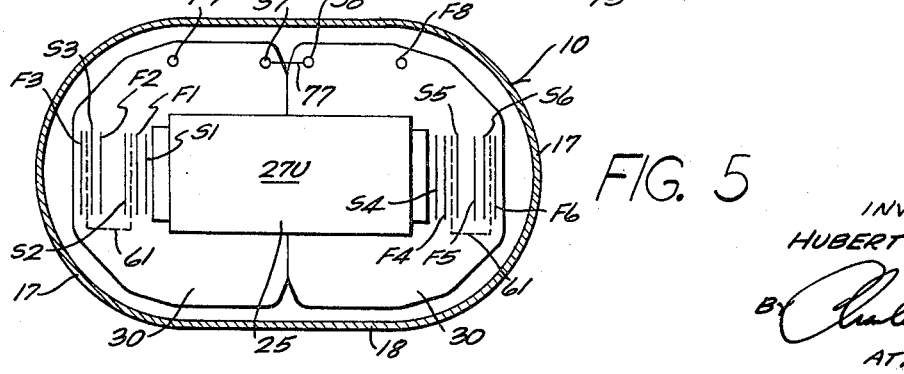

These and other objects and advantages of the invention will be more readily apparent from the following detailed description when taken in conjunction with the accompanying drawing wherein:

FIG. 1 is an elevation view of an electrical power distribution transformer embodying the invention;
FIG. 2 is an elevation view of the core and coil assembly of the transformer of FIG. 1;
FIG. 3 is a view taken along line 3—3 of FIG. 1;
FIG. 4 is a perspective view of the secondary leads at one end of the core and coil assembly shown in FIG. 2;
FIG. 5 is a schematic view illustrating the secondary leads of the embodiment of FIGS. 1 to 4;
FIG. 6 is a schematic circuit diagram of the embodiment of FIGS. 1 to 5; and
FIGS. 7 and 8 are graphs illustrating the variation of mean length of copper turn and mean length of iron respectively with core cross section.

Referring to FIG. 1 of the drawing, an electrical power distribution transformer of 250 kva. rating may be housed in a metallic tank 10 having a removable cover 11 and containing an insulating dielectric fluid 12 such as transformer oil (see FIG. 3). A removable hand hole cover 14 may be provided to permit access to the interior of tank 10. A plurality of cooling radiator tubes 15 mounted on the sidewall of tank 10 communicate with the interior of tank 10 adjacent the upper and lower ends thereof and permit circulation of transformer oil 12 by convection to the exterior of tank 10 for cooling. Tank 10 has a horizontal cross section defined by semicircular end walls 17 (see FIGS. 3 and 5) connected by generally straight sidewalls 18. A plurality of secondary insulating bushings 21 are mounted in spaced apart relation on one tank sidewall 18, and a pair of primary insulating bushings 22 are mounted on the tank end walls 17.

A transformer core and coil assembly 24 is immersed in the oil 12 within tank 10. Core and coil assembly 24 includes a closed magnetic core 25 having a pair of vertical winding legs 26 spaced apart along the longer horizontal axis of tank 10 and connected by horizontal upper and lower yokes 27U and 27L respectively and encircled by preformed coils 30. Magnetic core 25 preferably comprises mating complementary upper and lower halves 25U and 25L each of which has a plurality of compactly nested, lengthwise bent, U-shaped laminations 31 of magnetic strip steel. The ends 32 of the radially successive laminations 31 in each core leg 26 are preferably staggered in a direction longitudinal of the core 25, and the U-shaped laminations 31 in the upper and lower core halves 25U and 25L are inserted through the windows 33 in the preformed coils 30 from opposite ends thereof, and the lamination ends 32 on each layer meet in a butt joint in the core leg 26. Upper and lower channel core frame members 36L and 36U embrace the upper and lower core yokes 27L and 27U and may be connected by vertical tie rods 37 which extend through the windows 33 in the coils 30. Insulating clamping blocks 39 preferably of wood are disposed between the coils 30 and the frame members 36U and 36L, and the coils 30 are clamped against movement under short circuit forces by clamping members 40 which at one end engage clamping plates 41 disposed against the blocks 39 and at the opposite end are threaded with holes tapped in lugs 42 welded to the core frame members 36U and 36L.

Magnetic core 25 is preferably of D-shaped cross section and comprises radially inner relatively wide laminations 21W (see FIG. 3) of width $s$ stacked to a thickness $t$ and radially outer relatively narrow lamination 31N of width $y$ stacked to a thickness $a$. Each coil 30 preferably comprises a radially inner low voltage, or secondary winding 43 and a radially outer high voltage, or primary winding 44 with a tubular insulating barrier 48 disposed therebetween. Each primary winding 44 may comprise four layers of helically wound copper wire schematically shown in FIG. 6, and corrugated insulation 49 (see FIG. 3) may be disposed between certain layers of the primary winding 44 to provide cooling ducts for the upward circulation of oil 12 along the tank sidewalls 18 and the curved end walls 17 but the corrugated insulation is omitted within the window 50 of magnetic core 25.

Low voltage winding 43 may be constructed of conductive strip such as copper strip or aluminum strip having a width in a vertical direction substantially greater than its thickness, for example, copper strip having a width of approximately 14 inches and a thickness of approximately .022 inch may be utilized, and adjacent turns of the conductive strip may be separated by thin sheet insulation (not shown) such as a plurality of layers of kraft paper or layers of kraft paper laminated with plastic film. Low voltage winding 43 as shown in FIGS. 3 and 6 comprises three sections 53, 54 and 55. The radially inner low voltage section 53 may be wound on a coil form 56 of insulating material surrounding core leg 26, and the start and finish leads S1 and F1 respectively may comprise wide and relatively thick conductive strip, for example, $\frac{1}{16}$ inch thick, soldered to the first and last turns thereof respectively and extending in a vertical direction adjacent the narrower laminations 31N and the middle of semiconductor tank end wall 17. The low voltage section 54 may also comprise a plurality of turns of such wide conductive strip surrounding the radially inner section 53, and the start and finish leads S2 and F2 respectively may comprise such wide and relatively thick conductive strip soldered to the first and last turns thereof and extending in a vertical direction adjacent the midpoint of the semicircular tank end wall 17. The second section 54 may comprise twice as many turns of conductive strip as sections 53 and 55, and corrugated spacer insulation 58 may be disposed between certain turns of second section 54 along the tank end walls 17 and sidewalls 18 but is omitted in the core window 50.

The radially outer low voltage section 55 may also comprise a plurality of turns of wide conductive strip similar to the radially inner section 53 and surrounding the center section 54, and the start and finish leads S3 and F3 of the radially outer section 55 may comprise wide and relatively thick conductive strip soldered to the first and last turns thereof respectively and extending in a vertical direction adjacent the midpoint of the semicircular tank end wall 17. Corrugated insulation 60 may be provided between radially outer section 55 and the insulating barrier 48 to provide cooling ducts for circulation of oil 12 along the tank end wall 17 and side walls 18, but the corrugated insulation 60 is omitted within the core window 50. A strip of corrugated spacer insulation 62 may be disposed between the radially inner section 53 and the second low voltage section 54 to provide additional cooling ducts for upward circulation of oil 12 by convection flow adjacent the narrower laminations 31N.

As shown in FIGS. 4, 5, and 6, secondary lead F1 may be connected to secondary lead S3 by a U-shaped strip 61 of conductive strip such as copper soldered thereto above coil 30 and embracing, but spaced from, secondary leads S2 and F2. The leads S1, S2, F2, and F3 are staggered in height and spaced apart radially adjacent the midpoint of the semicircular tank end wall 17, and each lead is split longitudinally adjacent its upper end and the resulting furcations are bent into eye terminals 63 and 64 which are disposed at different heights. The eye terminals 63 and 64 are crimped to heavy copper wire conductor 65 covered with insulation and which extend upwardly and lay along the top surface of upper core frame 36U (see FIG. 2) and are bent upwardly and connected by bolts 67 to spade type copper terminals 68 which engage the conductive studs of the secondary insulating bushings 21.

Paperboard sheet insulation (not shown) may be provided between adjacent secondary leads S1, F1, S2, F2, S3 and F3.

The secondary winding sections 73, 74, 75 (see FIG. 6) on the other core leg and omitted from FIG. 3 are substantially identical to the sections 53, 54, and 55, and the secondary leads S4, F4, S5, F5, S6 and F6 therefor are substantially identical to those described for the sections 53, 54, and 55 and the description thereof will not be repeated herein. FIG. 6 is a schematic circuit diagram of one possible connection of the secondary coils 53, 54, 55, 73, 74 and 75 to the four secondary insulating bushings 21 by means of copper wires 65, and it will be appreciated that the showing of all such leads 65 is impossible in FIG. 2.

The start leads S7 and S8 of the primary windings 44 of the two coils 30 may be connected together by a suitable connection 77 adjacent the upper end and the back-to-back surfaces of the coils 30. The finish leads F7 and F8 of the two primary windings 44 (not shown in FIGS. 2 and 3) may extend vertically adjacent the junction of the tank end walls 17 with the tank side walls 18 and be connected to the conductive studs of the primary insulating bushings 22.

The disclosed construction permits material reduction in weight and cost and losses in comparison to conventional power distribution transformers. One embodiment of the invention of 250 kva. rating having a 120/240 volt secondary and 7200 volt primary with 2½ percent taps above and below normal resulted in a saving of approximately 100 pounds in weight and a cost reduction of approximately thirty dollars in active material in comparison to conventional structures. The disclosed core and coil assembly 24 having back-to-back D-shaped coils 30 and secondary leads adjacent the midpoint of the semicircular tank end walls is symmetrical in configuration and conforms closely in contour to the obround tank 10 and is spaced approximately uniformly from the tank walls around the entire periphery thereof and permits a reduction in the size of the tank 10 and the weight of oil 12 in comparison to known structures wherein the core and coil assembly is dissymmetrical in configuration and the spacing between the core and coil assembly and the circular tank wall varies widely around the perimeter thereof and a greater amount of oil is provided than required for insulation and cooling purposes.

The secondary leads are positioned adjacent the midpoint of the semicircular tank end walls 17 where sufficient space exists for the increased buildup resulting the leads without increase in tank size as required with structures wherein the primary leads are located on one side and the secondary leads on the opposite side of the core and coil assembly. Cooling ducts provided by the corrugated insulation of the disclosed structure are eliminated from the core window but are concentrated along both sides of the core leg and immediately adjacent the core window so that the portions of the windings within the core window are kept at a low temperature. Location of the secondary leads adjacent the midpoint of the semicircular tank end walls 17 permits the coils 30 to be blocked against short circuit forces immediately adjacent the core window along both sides of the core and coil assembly, and it will be appreciated that conventional structures (wherein primary and secondary leads are on opposite sides of the core and coil assembly) permit blocking each coil at one end only and that such construction is inferior in short circuit strength to blocking along both sides of the core and coil assembly. Short circuit strength is dependent upon the low and high voltage coils having electrical centers at the same elevation and being tied together solidly at the barrier by means such as varnish and wedges, but external blocking at the top and bottom of the coils is also important. Wedges driven between the core and coils within the core window provide high mechanical short circuit strength on small kva. size transformers but are less effective on larger sizes such as 250 kva. transformers because of shrinkage of insulation during baking. Consequently, it is advantageous on large kva. transformers to have blocking means disposed symmetrically on both sides of the core and coils and immediately adjacent the core window where the forces are the most severe. Short circuit tests indicate that transformers embodying the invention can withstand short circuit currents of greater than forty five times rated current without failure. Further, the disclosed arrangement of secondary leads with coil blocks at the sides rather than at the ends of the core and coil assembly permits reduction in the size of the core clamping frames in comparison to known arrangements.

The disclosed construction permits selection of width and stack height of the wide and narrow laminations 31W and 31N which result in optimum mean length of iron turn (mli.) and optimum mean length of copper turn (mlt.) thereby assuring minimum losses and cost and weight for the transformer. Repeating the following designations:

*s* equals width of wider laminations 31W
*t* equals stack height of wider laminations 31W
*a* equals stack height of narrower laminations 31N
*y* equals width of narrower laminations 31N.

FIG. 7 illustrates the variation of mean length of copper turn (mlt.) with the ratio $t/s$ and discloses that optimum mlt. occurs when the ratio $t/s$ is close to unity and the core cross section is approximately square. FIG. 8 illustrates the variation of mean length of iron turn (mli.) with the ratio $t/s$ and reveals that optimum in mli. occurs when the ratio of $t/s$ is small, i.e., when the radial thickness of the laminations is small. (The calculations for FIGS. 7 and 8 were made by dividing mlt. and mli. by $\sqrt{A}$, where A is the cross sectional area of the core, to obtain values that are dimensionless and independent of the size of the transformer; the calculations for FIG. 7 ignored the buildup of the windings; the calculations for FIG. 8 assumed zero core window dimensions; and the two curves were plotted keeping constant the parameters $ts/A = 0.9$ and $y/s = 0.8$.) Considering the slope of the two curves and weighing them against the ratio of cost of core steel to the cost of copper conductor, the core loss, and the winding loss, it was found that minimum cost and weight and losses occur when the ratio $t/s$ is between approximately 0.3 and 0.8, and the optimum ratio $t/s$ within this range is dependent upon transformer kva. size and voltage rating. For the 7200 volt transformer of 250 kva. rating shown in FIGS. 1-6, optimum design to achieve minimum cost, weight, and losses occurs when the ratio of $t/s$ is approximately 0.6.

When the secondary leads are positioned adjacent the midpoint of the semicircular tank end walls and the ratio of $$\frac{a+t}{s}$$

is less than unity, the mean length of copper turn mlt. increases less, because of the buildup by the leads, than with conventional structures wherein the secondary leads are on one side of the core and coil assembly.

While only a single embodiment of the invention has been illustrated and described, many modifications and variations thereof will be readily apparent to those skilled in the art, and consequently it is intended in the appended claims to cover all such modifications and variations which are within the true spirit and scope of the invention.

I claim:
1. In an electrical power distribution transformer apparatus having a tank provided with two opposed straight sides and two opposed convexly curved sides each connecting an end of a straight side, a transformer core and coil assembly within said tank and including a closed magnetic core having upper and lower horizontal yokes positioned parallel to the straight sides of the tank and two vertical winding legs respectively connecting together an end of each of the upper and lower yokes, a coil positioned around each of said vertical winding legs including a low voltage winding adjacent the winding leg and a high voltage winding concentric with the low voltage winding, the improvement comprising:
 a winding construction wherein the low voltage winding comprises a conductive strip having a width in a vertical direction many times greater than the thickness of the strip; and
 vertically extending conductive secondary leads affixed to turns of said conductive strip substantially between the midpoint of the curved sides of said tank and the winding legs of the magnetic core.
2. A transformer in accordance with claim 1 wherein each said low voltage winding includes a plurality of concentric sections each of which comprises a plurality of turns of said conductive strip and the first and last turns of said sections are affixed to said secondary leads;
 said secondary leads are thin conductive members having a width considerably greater than their thickness and are spaced apart radially and certain of said secondary leads are bifurcated at their upper ends and the furcations terminate in bent-over eye terminal portions disposed at different heights above said coil.
3. A transformer in accordance with claim 1 further comprising:
 upper and lower core frame channel members disposed over said upper and lower yokes respectively;
 tie bolt means interconnecting said upper and lower frame members; and
 blocking members of insulating material disposed between said coils and both legs of said channel frame members and tightly engaging said coils to prevent movement of said coils under short circuit forces.
4. The combination according to claim 1 wherein:
 the winding leg of said core is of approximately D-shaped cross section and includes a plurality of groups of lamination layers with each of said groups having a narrower width than the most adjacent radially inward group; and
 said secondary leads are positioned between the curved sides of said tank and the winding legs of the magnetic core directly opposite the lamination layer group having the narrowest width.
5. The combination according to claim 4 wherein said core and coil assembly has an approximately D-shaped cross section at the winding legs thereof and said D-shaped cross section has a lateral dimension parallel to the straight sides of said tank, a longitudinal dimension transverse to said lateral dimension and the ratio of said lateral dimension to said longitudinal dimension does not exceed unity, whereby cross sectional dimensions are obtained which simultaneously provide an optimum coil turn length and an optimum core iron turn length.

References Cited

UNITED STATES PATENTS

| | | | |
|---|---|---|---|
| 1,224,149 | 5/1917 | Dann | 336—197 |
| 1,760,540 | 5/1930 | Brand | 336—94 X |
| 2,710,947 | 6/1955 | Gaston | 336—223 X |
| 2,900,611 | 8/1959 | Benke | 336—228 X |
| 3,074,037 | 1/1963 | Stein | 336—223 X |

LARAMIE E. ASKIN, *Primary Examiner.*
D. A. TONE, *Assistant Examiner.*